UNITED STATES PATENT OFFICE.

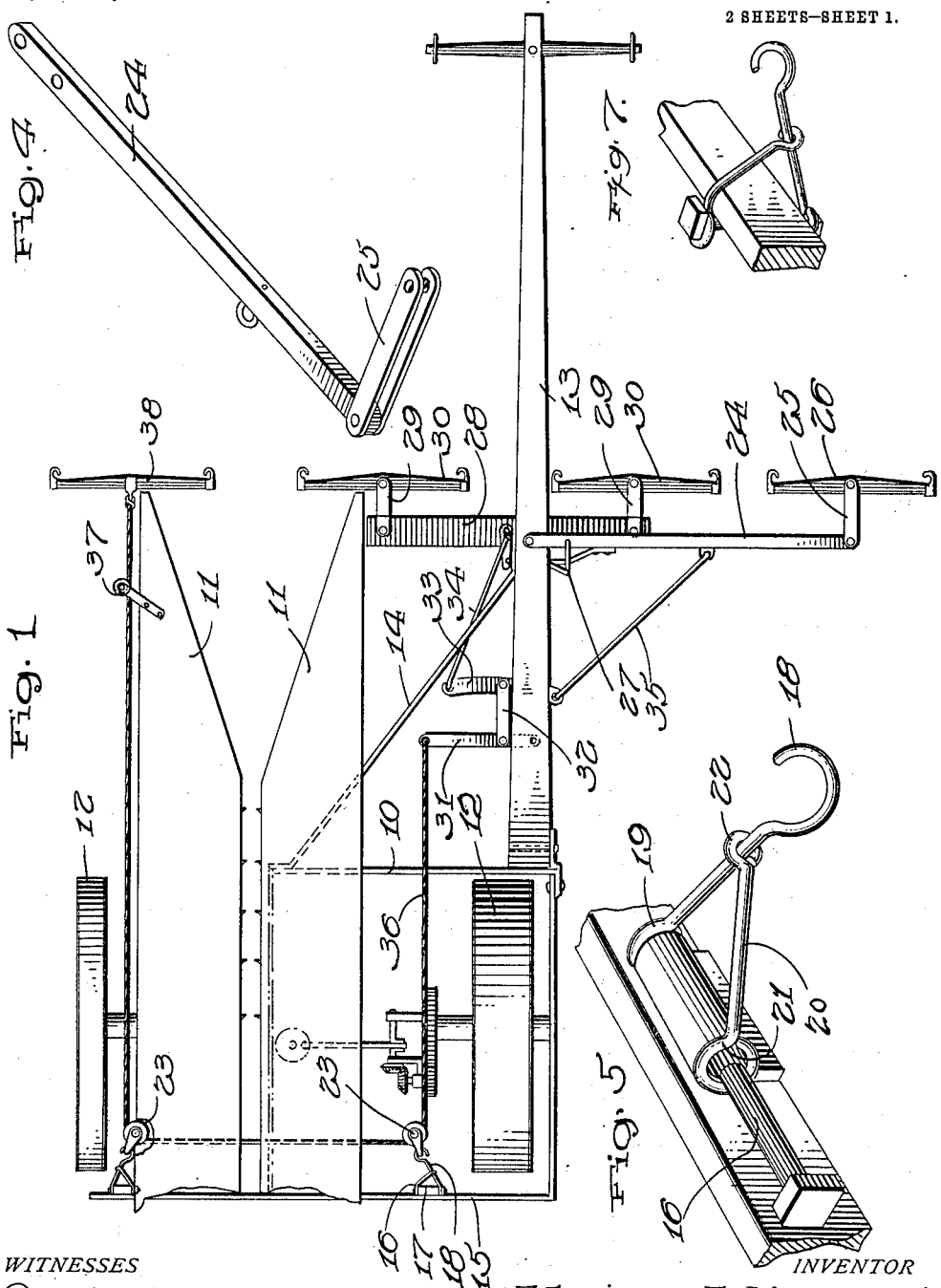

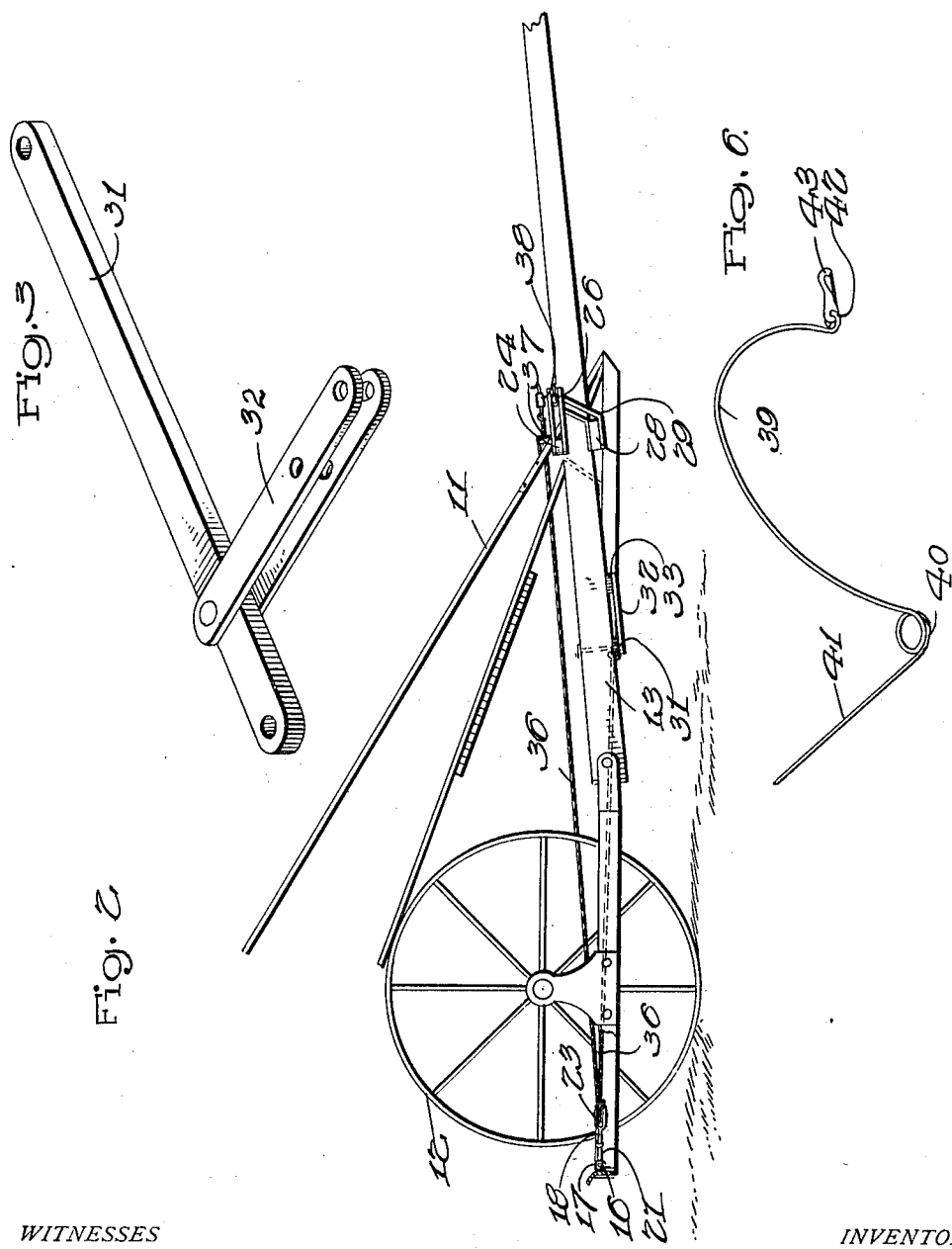

ELVIA E. LIPPERD, OF CAMBRIDGE, KANSAS.

DRAFT-EQUALIZER.

1,051,740.  Specification of Letters Patent.  Patented Jan. 28, 1913.

Application filed May 27, 1912. Serial No. 700,015.

*To all whom it may concern:*

Be it known that I, ELVIA E. LIPPERD, a citizen of the United States, residing at Cambridge, in the county of Crowley and State of Kansas, have invented certain new and useful Improvements in Draft-Equalizers, of which the following is a specification, reference being had therein to the accompanying drawing.

This invention relates to draft equalizers and has special reference to a draft equalizer peculiarly adapted for use in connection with corn harvesters and as shown it is desired to employ four horses, three on the harvested side and one between the row being harvested and the next adjacent row of the growing plants.

The principal object of the invention is to improve and simplify the general construction of devices of this character.

A second object of the invention is to provide an improved means whereby the fourth horse may be attached.

A third object of the invention is to provide improved means whereby the fourth horse may be controlled by means passing over the tops of the corn rows.

With the above and other objects in view, the invention consists in general of certain novel constructions, combinations and arrangements of parts as will be hereinafter fully described, illustrated in the accompanying drawings and specifically claimed.

In the accompanying drawings, like characters of reference indicate like parts in the several views, and Figure 1 is a plan of a harvester equipped with this invention. Fig. 2 is a side elevation thereof. Fig. 3 is a detail of a certain lever used in connection herewith. Fig. 4 is a similar detail of another lever. Fig. 5 shows the method of attaching the device to the rear of the harvester frame. Fig. 6 shows the device used for connecting the third and fourth horses. Fig. 7 is a detail view of a certain attaching means used in connection herewith.

In the drawings accompanying this specification there has been shown a corn harvester of the single row type, the greater part of the mechanism being omitted as the same in general has been shown only as an indication of some harvester, the device being capable of being applied to various type of harvesters.

In the form shown, the harvester is provided with a frame 10, guide members 11, and ground wheels 12 supporting the frame. At one corner of the frame is a tongue 13 which is secured to the frame at the corner and braced thereto by a suitable brace 14.

The frame is provided with a rear transverse member 15 and on this member are certain parts which are connected to the member by means of bolts 16 passing through ears 17. These bolts are used to attach certain portions of the improved device, which portions consist of the hooks 18 having each an eye 19 through which the respective bolt passes, and braces 20 provided with eyes 21 at one end through which the respective bolt passes and an eye 22 at the other end through which the shank of the hook passes. On each of these hooks is mounted a single pulley 23.

Pivoted to the tongue 13 at one of its ends is a lever 24 the other or free end whereof is provided with a link 25 to which is connected a swingle tree 26. Connected to this lever 24 adjacent its pivoted end is a bent bar 27 to the opposite end whereof is connected a double tree 28 provided at each end with a link 29 carrying a swingle tree 30. Adjacent the rear end of the tongue 13 there is provided a lever 31 which is pivoted at one of its ends to said tongue. Intermediate its ends this lever has connected thereto a pair of links 32 to the forward ends whereof is pivoted a lever 33. Secured to one end of the lever 33 is a link 34 which is connected centrally to the double tree 28. Secured to the other end of said lever 33 is a link 35 which is connected centrally to the lever 24. Secured to the outer end of the lever 31 is a rope 36 which passes backward and through the pulleys 23 and again forward and through a suitable guide 37 carried by the forward end of the frame and one of the members 11, and on the end of this rope is a swingle tree 38. It will be noted that this last mentioned swingle tree is on the outside of one member while the swingle tree 30 is on the outside of the other, thus a row of plants can pass between said swingle tree and a horse hitched to the swingle tree 38 will be on the opposite side of the row from the remaining horses.

In order to provide means for guiding the horse hitched to the swingle tree 38 there is employed an arched bar 39 having a horizontal loop 40 formed therein for the reception of the left hand hame of the horse adjacent the row. In order to hold this bar in proper position the loop 40 is continued rearwardly in a portion 41 arranged to pass through one of the terret rings of the harness of this horse but, if desired, special provision may be made on the harness for connecting this bar. The other end of the arch 39 is provided with a loop 42 wherein is engaged one end of a clip 43 which is adapted for engagement with the right hand bridle ring of the left hand horse's harness.

In the detail shown in Fig. 7 a modified means of securing the device is illustrated. In this detail the clamp is arranged so that the bolt 16 lies behind the frame bars, thus enabling the clamp to be adjusted along the bars. By means of this arched construction the arch passes over the tops of the corn plants without beating them down so that the harvester can operate. There has thus been provided a simple and efficient device of the kind described and for the purpose specified.

It is obvious that many minor changes may be made in the form and construction of this invention without departing from the material principles thereof and it is therefore not wished to confine the invention to the exact form herein shown and described, but it is wished to include all such as properly come within the scope claimed.

Having thus described the invention, what is claimed as new, is:—

1. In a device of the kind described, a wheel supported frame, a tongue extending forwardly from said frame, spaced pulleys carried by said frame, a rope leading from said pulleys and extending forwardly therefrom at each end, one end of said rope being provided with draft animal attaching means, the other end of said rope being connected to a lever having its opposite end pivoted to the tongue, a link pivoted to said lever intermediate its ends, a second lever pivotally connected to the link by a centrally disposed pivot, a link leading forward from the second lever, a double tree pivoted to the forward end of said link, swingle trees carried on the ends of said double tree, a third lever pivoted to said tongue and extending in an opposite direction to the first mentioned lever, a link connecting the center of the third lever with the remaining end of the second lever, and a double tree carried on the outer end of said third lever.

2. The combination with a harvester having a gathering device, of pulleys attached to said harvester on opposite sides of the gathering device, a tongue attached to the harvester at one side of the gathering device, a rope extending over said pulleys and having one of its ends provided with a swingle tree, a lever attached to the other end of said rope and having its remaining end pivoted to said tongue, a link extending forward from said lever, a second lever centrally connected to said link, a second link extending forwardly from the end of the second lever, a double tree connected to the forward end of said second link, swingle trees carried at the ends of said double tree, a third lever having one end pivoted to the tongue and provided with a swingle tree at its remaining end, and a link connecting the center of the third lever with the remaining end of the second lever.

In testimony whereof I hereunto affix my signature in presence of two witnesses.

ELVIA E. LIPPERD.

Witnesses:
W. F. MOON,
J. J. BENJAMIN.

Copies of this patent may be obtained for five cents each, by addressing the "Commissioner of Patents, Washington, D. C."